Feb. 2, 1926.
A. J. KERTH
AUTOMOBILE BED
Filed June 30, 1924
1,571,549
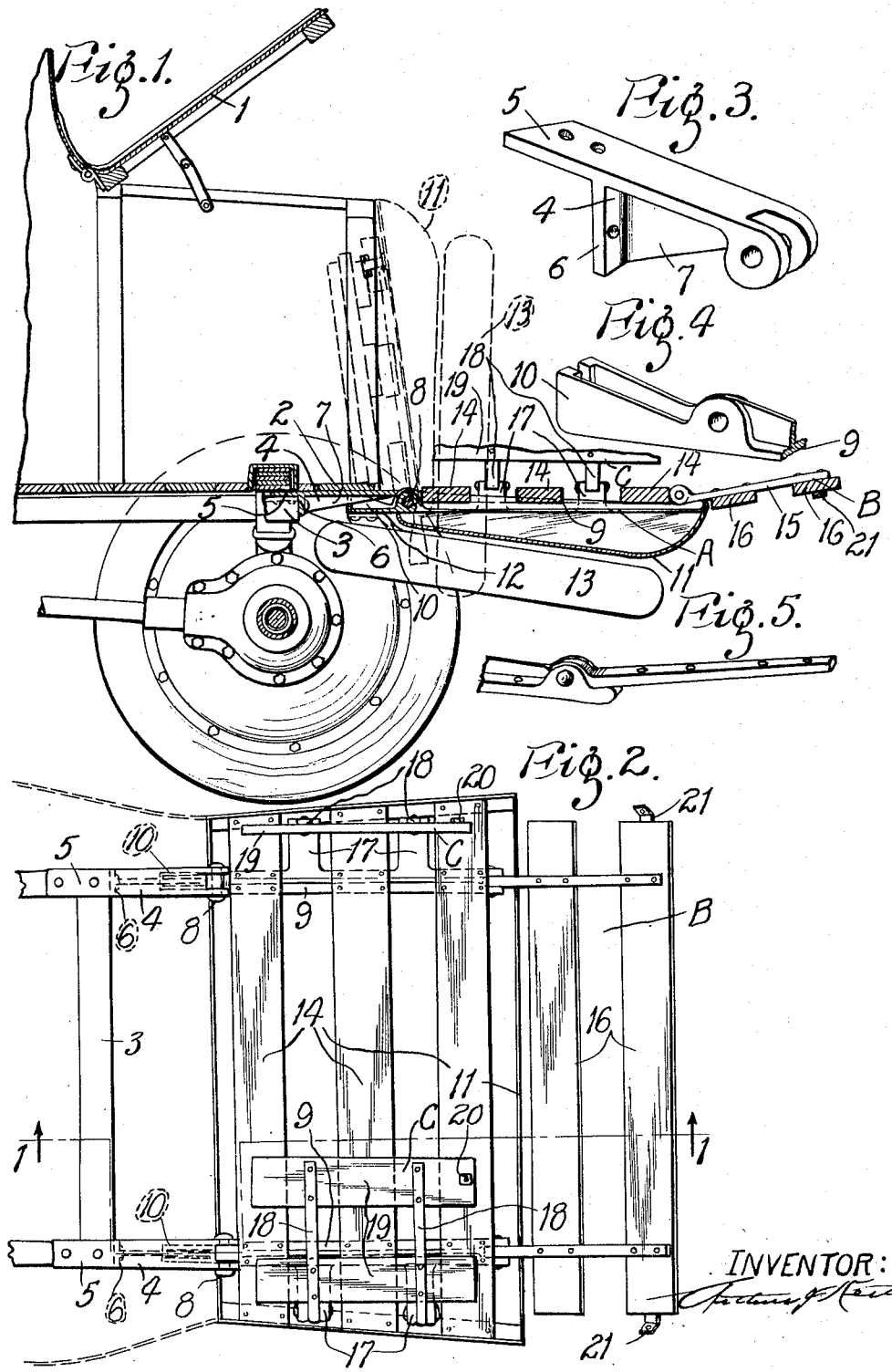
INVENTOR:

Patented Feb. 2, 1926.

1,571,549

UNITED STATES PATENT OFFICE.

ARTHUR J. KERTH, OF CLAYTON, MISSOURI.

AUTOMOBILE BED.

Application filed June 30, 1924. Serial No. 723,259.

*To all whom it may concern:*

Be it known that I, ARTHUR J. KERTH, a citizen of the United States, and a resident of the city of Clayton, in the county of St. Louis and State of Missouri, have invented a new and useful Improvement in Automobile Beds, of which the following is a specification.

My invention relates to convertible automobile bodies and has for its principal object a body which has the external appearance of a standard type of body but which has a portion that can be converted into a truck or luggage carrier or into a bed. The invention consists in the convertible automobile body and in the parts and combinations of parts hereinafter described and claimed. In the accompanying drawing, which forms part of this specification and wherein like reference numerals indicate like parts wherever they occur, Fig. 1 is a longitudinal sectional view of the rear part of an automobile body embodying my invention, the section being taken on the line 1—1 of Fig. 2;

Fig. 2 is a top plan view thereof;

Fig. 3 is a detail view of one of the brackets for mounting the end piece on the automobile body frame;

Fig. 4 is a detail view of one of the hinge members for securing the end piece to the brackets; and Fig. 5 is a detail view of one of the supporting arms of the extension of the end piece.

Common types of automobiles are the so called roadsters, and coupés, whose bodies have rear compartments that have a hinged cover 1 and are adapted to contain a limited amount of baggage or other articles. The rear portion of a coupé is shown in the drawing. According to my invention, the body is provided with an end member A pivotally secured thereto, which end member may be swung down to form an extension of the floor 2 of the coupé body and constitute a support for a bed or for baggage or other articles.

Secured to a transverse member 3 of the frame are brackets 4 that have an arm 5 adapted to be bolted or otherwise secured to the top face of the transverse member 3 and an arm 6 adapted to be bolted or otherwise secured to the side face thereof. Each bracket is also provided with a depending web portion 7. Pivotally secured to each bracket 4 as by a bolt 8 is an arm 9 that has a projecting bifurcated end portion 10 adapted to straddle the web 7 of the bracket.

To the arms 9 is secured an ornamental cover 11 of sheet metal or the l ke, said cover having substantially the same appearance as the standard end member. A carrier 12 for a spare tire 13 may be secured to said cover. Extending transversely of the arms 9 and secured thereto are cross pieces 14 preferably boards that are on substantially the same horizontal level as the floor 2 of the rear compartment of the automobile body, when the end member A is open or lowered.

Pivotally secured to the outer ends of the arms 9 are rods 15 that have cross boards 16 secured thereto. Such cross boards 16 and rods 15 constitute an extension B of the end member and may be opened out as shown in Figs. 1 and 2.

Each supporting arm 9 of the end member has projections 17, to each of which is pivotally secured a rod 18 that has boards 19 secured thereto, thus form'ng hinged side members C that may be swung upwardly when the automobile is used as a truck.

To a board 19 of each side member is secured a latch member 20 and to the ends of a board of the end extension are secured cooperating latch members 21. Thus, the end extension B may be swung upwardly and secured to the side members C, thus forming an enclosure for the truck portion of the automobile.

As indicated in dotted lines in Fig. 1, the side members C may be folded over on the end member A, the end extension B folded over on the side member C and the end member A be swung upwardly, thus closing the rear portion of the automobile body, and giving it the ornamental appearance of the ordinary closed rear portion of an automobile body. If it is desired to use the automobile as a truck, or to carry luggage while touring, the end member A may be opened out and the side members C and the end extension B raised and secured together, thus forming a truck body of considerable size.

If it is desired to use the automobile for sleeping, the end extension may be opened out as shown in Figs. 1 and 2 and the side members folded down against the end member, thus forming a support for suitable bedding.

The automobile body herein described has numerous advantages. It is adapted to carry luggage and the like, to be used as a bed and still the truck or bed portion can be easily and quickly folded into inoperative position; and when so folded, the body has the usual neat appearance of a pleasure vehicle and not the unsightly appearance of a truck or camping car. Obviously numerous changes may be made without departing from the invention and I do not wish to be limited to the precise construction shown.

What I claim is:

1. In combination with an automobile body including a transverse frame member, brackets secured to said frame member, each of said brackets having a depending web portion, arms pivotally secured to said brackets, each of said arms having a bifurcated end portion adapted to straddle the web of a bracket and a cross member mounted on said arms.

2. In combination with an automobile body including a transverse frame member, brackets secured to said frame member, arms pivotally secured to said brackets, cross pieces secured to said arms, and an end extension and side members pivotally secured to said arms.

3. In combination with an automobile body including a transverse frame member, brackets secured to said frame member, each of said brackets having a depending web portion, arms pivotally secured to said brackets, each of said arms having bifurcated end portions adapted to straddle the web of a bracket, cross pieces secured to said arms, and an end extension pivotally secured to said arms.

4. In combination with an automobile body including a transverse frame member, brackets secured to said frame member, arms pivotally secured to said brackets, cross pieces secured to said arms, a rod pivotally secured to each of said arms, cross pieces secured to said rods, said arms having projections, a rod pivotally secured to each of said projections, and cross pieces secured to the rods of each arm.

5. In combination, an automobile body, an end member hingedly secured thereto, a cover for the rear portion of said body, and an extension and side members pivotally secured to said end member, said side members being foldable on the end member and being movable to upstanding position, and said end extension being foldable flatwise on said side members whereby said end member with the side members and end extension in folded position may swing upwardly against said cover to completely enclose the rear portion of said body, and said extension also being movable to upstanding position and to open position as an extension of said end member.

Signed at Clayton, Missouri, this 25th day of June, 1924.

ARTHUR J. KERTH.